United States Patent
Shi et al.

(10) Patent No.: US 10,949,563 B2
(45) Date of Patent: Mar. 16, 2021

(54) METHOD FOR GENERATING AND MAINTAINING RELIABLE DATA IN A NETWORK ENVIRONMENT

(71) Applicant: SUZHOU SUPERBLOCK CHAIN INFORMATION SCIENCE & TECHNOLOGY CO., LTD., Suzhou (CN)

(72) Inventors: Xingguo Shi, Suzhou (CN); Guangyu Chen, Suzhou (CN)

(73) Assignee: SUZHOU SUPERBLOCK CHAIN INFORMATION SCIENCE & TECHNOLOGY CO., LTD., Suzhou (CN)

( * ) Notice: Subject to any disclaimer, the term of this patent is extended or adjusted under 35 U.S.C. 154(b) by 159 days.

(21) Appl. No.: 16/086,392

(22) PCT Filed: May 12, 2017

(86) PCT No.: PCT/CN2017/084162
§ 371 (c)(1),
(2) Date: Sep. 19, 2018

(87) PCT Pub. No.: WO2017/198118
PCT Pub. Date: Nov. 23, 2017

(65) Prior Publication Data
US 2019/0102572 A1    Apr. 4, 2019

(30) Foreign Application Priority Data

May 17, 2016    (CN) .......................... 201610326235.9

(51) Int. Cl.
*G06F 21/64*    (2013.01)
*G06F 21/62*    (2013.01)
(Continued)

(52) U.S. Cl.
CPC .......... *G06F 21/6227* (2013.01); *G06F 21/57* (2013.01); *G06F 21/62* (2013.01);
(Continued)

(58) Field of Classification Search
CPC ... H04L 2209/38; H04L 63/12; H04L 67/104; G06F 21/6227; G06F 21/57; G06F 21/64; G06F 16/2365
See application file for complete search history.

(56) References Cited

U.S. PATENT DOCUMENTS

2016/0027229 A1*  1/2016  Spanos ................... G07C 13/00
                                                            705/51
2016/0028552 A1*  1/2016  Spanos ................ H04L 9/3236
                                                            713/178

(Continued)

OTHER PUBLICATIONS

Anonymous: "Bitcoin network—Wikipedia, the free encyclopedia" May 7, 2015, 9 pages, Retrieved on Jun. 22, 2020 from https://web.archive.org/web/20150507192610/https://en.wikipedia.org/wiki/Bitcoin_network.*

*Primary Examiner* — Matthew T Henning
(74) *Attorney, Agent, or Firm* — SV Patent Service

(57) ABSTRACT

A a method for generating and maintaining trusted data in a network environment includes: 1) initializing a data block $[A]_0$ and shared computation rules, and broadcasting the same to the network; 2) acknowledging a node of the data block $[A]_0$ as a participating node; when new data A needs to be added, n participating nodes independently computing a candidate data block $[A]_T$ of $[A]_1$ according to the shared computation rules, and broadcasting the same to the other n−1 participating nodes, wherein $[A]_1$ is a data block containing the newly added data A; 3) The n participating nodes determine an acknowledged candidate result $[A]_Y$ according to a monitored broadcast packet; and 4) the participating nodes computing the monitored $[A]_T/[A]_Y$, and, when the (Continued)

computation result satisfies a predetermined condition, the participating node determining the computation result thereof as an acknowledged result and broadcasting the same.

12 Claims, 12 Drawing Sheets

(51) Int. Cl.
 *G06F 21/57* (2013.01)
 *H04L 29/06* (2006.01)
 *H04L 29/08* (2006.01)
(52) U.S. Cl.
 CPC .............. *G06F 21/64* (2013.01); *H04L 63/12* (2013.01); *H04L 67/104* (2013.01)

(56) References Cited

U.S. PATENT DOCUMENTS

| | | | |
|---|---|---|---|
| 2017/0017954 A1* | 1/2017 | McDonough | G06Q 20/3226 |
| 2017/0116693 A1* | 4/2017 | Rae | H04L 9/3236 |
| 2017/0302663 A1* | 10/2017 | Nainar | H04L 63/123 |

* cited by examiner

METHOD FOR GENERATING AND MAINTAINING RELIABLE DATA IN A NETWORK ENVIRONMENT

TECHNICAL FIELD

The invention relates to the field of computer technologies, and specifically relates to a method for multi-nodes to collaboratively generate and maintain a group of trusted public data in a distributed network-computing environment.

BACKGROUND OF THE INVENTION

In a distributed network or the Internet, when the operations of multiple network nodes rely on the same data set (acknowledged data in this document), it is necessary to ensure that the data is credible and accurate. For example, each computing node of an online game relies on the same set of global data to run. Some network transactions need to rely on the same set of historical transaction credentials to process a new transaction request; some network applications may still require accesses to sustainable and trusted acknowledged data sources when nodes dynamically join and exit the network. Existing methods usually use centralized storage and authentication to ensure the credibility and accuracy of data. While centralized processing ensures the consistency of acknowledged data, it is also inflexible, has high cost of maintaining the central node and high risk of single point of failure, and can suffer malicious attacks and other issues. In addition, centralized processing is applicable to the trust and mutual trust of specific user groups and specific data, and it is difficult to implement for non-specific data processing between non-specific nodes.

Network Distributed Computing

Computing units in the network environment (including but not limited to computers) operate independently and perform specific computation tasks through specific communication protocols and application software.

The use of digital signature technology to authenticate and sign acknowledged data can solve the problem of mutual trust between specific nodes for specific data, but cannot solve the problem of mutual trust between non-specific nodes and non-specific data.

Traditional multiple backup or storage also has the above described problems.

Digital Signature

Digital signature technology is the most common data integrity protection mechanism that can produce a more reliable "data fingerprint" than human fingerprints. It encrypts digest information with the sender's private key and sends it along with the original text to the recipient. The recipient generates digest information from the original text received, and compares with the digest information decrypted using the sender's public key to verify the integrity of the information. The present invention uses digital signature technology to provide guarantees for integrity and legitimacy of data sent between nodes. The digital signature technology does not solve the problem of mutual trust between nodes. In the present invention, digital signature technology is used for data communication between non-trusted nodes without being maliciously tampered with.

Digital Digest

A hash function turns a message of any length into a fixed-length short message, which is similar to a function whose argument is a message. A digital digest uses a single hash function to convert a plaintext "digest" that needs to be encrypted into a string of cipher text of a fixed length (128 bits). This string of cipher text is also known as a digital fingerprint. It has a fixed length. Different plain text will always be converted to different cipher text; and the same plain text will always result in the cipher text. The present invention uses digital digests to organize discrete acknowledged data into related data.

Combining digital signatures and node-independent storage can solve the drawbacks caused by centralized processing and storage to a certain extent. This method is only applicable to static data and specific nodes with trusted relationships. It is difficult to handle trust and mutual trust in dynamically generated data between dynamically joined non-specific nodes. The method is easily affected by malicious nodes or network transmission errors in a network environment.

Adding the traditional CA mechanism in the above method can solve the problem of mutual trust in non-specific data between non-specific nodes, and can eliminate the influence of malicious nodes, but it requires a specific organization to maintain a set of verification mechanisms. It is still a centralized process, suffering all the aforementioned drawbacks in centralized processes.

The use of peer-to-peer (P2P) networks to store and publish acknowledged data can maintain data's common attributes and redundant reliability. It can solve the mutual trust in specific data between non-specific groups. However, it is only applicable to static data storage, and cannot provide trust and mutual trust in non-specific data and dynamic data. In addition, P2P networks cannot properly handle data persistence and historical problems.

Peer-to-Peer Network

When there are no specific priority nodes and central control nodes in a network distributed computing environment, the computing nodes cooperate in distributed computing in a peer-to-peer manner.

None of the above methods can solve the problem of credibility of acknowledged data in a completely open scenario. In the present invention, "a completely open scenario" refers to an environment that is open to the entire network and an application scenario in which data needs to be retained for an indefinite time span.

In summary, a completely open scenario has the following features:

1. A message is sent to the entire network; the receiver or user is not determined;
2. The time span for information production and ultimate information utilization is undetermined;
3. There is no specific central processing node to undertake centralized processing; and
4. Information transmission and storage media are also unspecified.

As a result, several major issues need to be addressed in a fully open scenario:

1. Damages from malicious nodes;
2. Persistence and consistency of the acknowledged data; and
3. The long-term credibility of the acknowledged data.

SUMMARY OF THE INVENTION

In view of the problems in conventional technologies, the purpose of the present invention is to provide a method for generating and maintaining trusted data in a network environment. The disclosed method can generate and maintain the trusted data structure and prevent tampering through cooperation between nodes in a peer-to-peer computing environment without a central control node and a trusted node.

The technical scheme of the invention is as follows:

A method for generating trusted data in a network environment, including the steps of:

1) Initializing a data block $[A]_0$ and shared computation rules, and broadcasting the data block $[A]_0$ and the shared computation rules to the network;

2) Recognizing a node that has acknowledged the data block $[A]_0$ as a participating node;

3) When n participating nodes need to add new data A, the n participating nodes independently calculate a candidate data block $[A]_T$ of $[A]_1$ according to the shared computation rules, wherein the data block $[A]_1$ includes the new data A, which is a successor data block to $[A]_0$;

4) the n participating nodes respectively broadcast respective computation results $[A]_T$ by to other participating nodes; and 5) One of the other participating nodes monitors broadcast packets and performs computations on the computation result $[A]_T$ on; when a computation result satisfies a predetermined condition, the participating node determines the computation result $[A]_T$ as an acknowledged candidate result, and broadcasts the computation result $[A]_T$.

A method for maintaining trusted data in a network environment, including the steps of:

1) When n participating nodes associated with n acknowledged data blocks $[A]_n$ need to add new data A, the n participating nodes calculate a candidate data block $[A]_T$ for data block $[A]_{n+1}$ in accordance with shared computation rules corresponding to the data blocks $[A]_n$, wherein the data block $[A]_{n+1}$ contains new data A, wherein a node that has acknowledged the data blocks $[A]_n$ is recognized as a participating node by the computer network;

2) The n participating nodes respectively broadcast their respective computation results $[A]_T$ to other participating nodes; and 3) The one of the other participating nodes monitors broadcast packets and performs computations on the computation result $[A]_T$; when a computation result satisfies a predetermined condition, the one of the other participating nodes determines the computation result $[A]_T$ as an acknowledged candidate result, and broadcasts the computation result $[A]_T$.

Further, the step of respectively broadcasting respective computation results $[A]_T$ by the n participating nodes to other participating nodes can include: respectively appending verification data to the respective computation results $[A]_T$ by the n participating nodes and broadcasting computation results $[A]_T$ appended with the verification data to other participating nodes. The step of determining the computation result $[A]_T$ as an acknowledged candidate result by the one of the other participating nodes can include: appending verification data to a correspond computation result $[A]_T$ to denote as $[A]_Y$ by the one of the other participating nodes; and broadcasting $[A]_Y$ as an acknowledged candidate.

Further, the acknowledged candidate $[A]_Y$ are monitored and verified by the other participating nodes, and a verification result is broadcasted to a monitoring node. Broadcast packets are monitored and computations are performed on the computation result $[A]_T$ by the participating node. When a computation result satisfies a predetermined condition, the computation result $[A]_T$ is determined as an acknowledged candidate result and is broadcasted by the other participating node.

Further, broadcast packets are monitored and the acknowledged candidate result $[A]_T$ is verified by a participating node. A verification result is broadcasted to a monitoring node. The monitoring node can collect the verification result and perform computation on broadcast packets. When the computation result satisfies a predetermined condition, the monitoring node can determine $[A]_1$ corresponding to the computation result $[A]_T$ as an acknowledged candidate result by the one of the other participating nodes, and broadcasts it to the network.

Further, the data block $[A]_0$ further includes a legitimacy determination rules and a verification rules, wherein in step 5), the broadcast packets are verified by the one of the other participating nodes using the verification rules. After the verification is passed, the computation result $[A]_T$ in the broadcast packet can be calculated. When a computation result satisfies a predetermined condition, the computation result $[A]_T$ can be determined as an acknowledged candidate result by the one of the other participating nodes, and the computation result $[A]_T$ is broadcasted.

Further, the the data block $[A]_0$ can be initialized and broadcasted to the computer network via an origination node.

Further, the basic description information, the shared computation rules, the legitimacy determination rules, and the verification rules can all be defined by the origination node.

Further, each of the n participating nodes can independently maintain a trust list for other nodes.

Further, when a new node joins a peer-to-peer distributed network formed by the n participating nodes, the new node can request any of n participating nodes to provide all or a portion of currently acknowledged result [A]. The validity and correctness of the currently acknowledged result [A] can be verified based on data packets returned from any of the n participating nodes. After the verification passes, the new node can become a participating node.

For the generation method, when the new data is added, each of the n participating nodes can make a digital digest of the data block $[A]_{n-1}$ or any data block in the data block group [A]. The digital digest can be used as the computation basis for a subsequent new data block $[A]_n$ and included in a newly generated $[A]_T$. Steps 4) through 5) can be repeated to update the acknowledged data block [A].

For maintenance method, when the new data is added, each of the n participating nodes can make a digital digest of the data block $[A]_{n-1}$ or any data block in the data block group [A]. The digital digest can be used as the computation basis for a subsequent new data block $[A]_n$ and can be included in a newly generated $[A]_T$. Steps 2) through 3) can be repeated to update the acknowledged data block [A].

The present invention has the following advantageous features:

1. The acknowledged data in the peer-to-peer network is jointly maintained and held by nodes in the entire network. There is no specific trust relationship between the nodes, and a continuous chain check structure is used to audit and maintain integrity of the acknowledged data.

2. The newly added acknowledged data is calculated independently by the nodes in the network. The computation results are mutually verified by the nodes according to the verification rules. The data that has passed the verification is the legitimate new data. The new data does not modify the existing acknowledged data, and is only added to the end of the existing data.

3. The most validated computation results are used as acknowledged data, which are stored independently by each node and are broadcasted to other nodes in the network in the form of broadcasts.

4. A newly added node can randomly request accesses to multiple existing nodes in the network to obtain acknowledged data. By comparing the obtained data, data that is inconsistent with the verification rules is discarded, and the consistent data is retained, to obtain a copy of correct and legitimate acknowledged data.

Compared with the conventional technologies, the present invention includes the following positive effects:

Using the disclosed method, un-trusted nodes on a distributed network can maintain the same acknowledged data and ensure that malicious nodes cannot tamper with the acknowledged data. This method can be implemented in a non-trusted network environment, to maintain a recognized trust basis through self-organization in absence of a central control node.

DETAILED DESCRIPTION OF IMPLEMENTIONS

The technical content of the present invention will be further described in detail with reference to the accompanying drawings.

Implementation Method 1

Implementation environment and conditions: a public network without master nodes, network nodes running software in accordance to the present invention.

Figure 5:
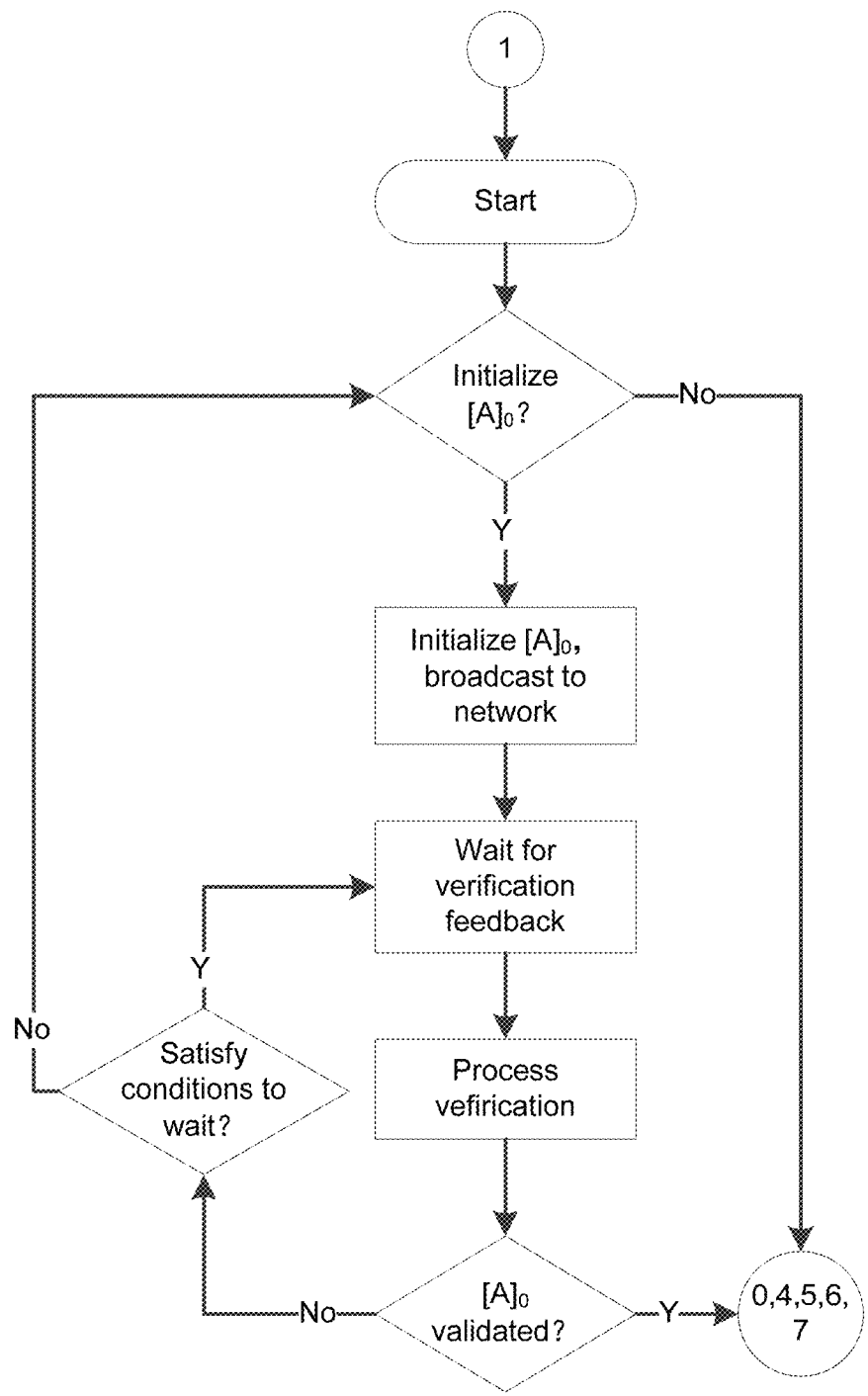
FIG. 5 illustrates an execution flow for a node to perform an initialization of acknowledged data.
Figure 6:
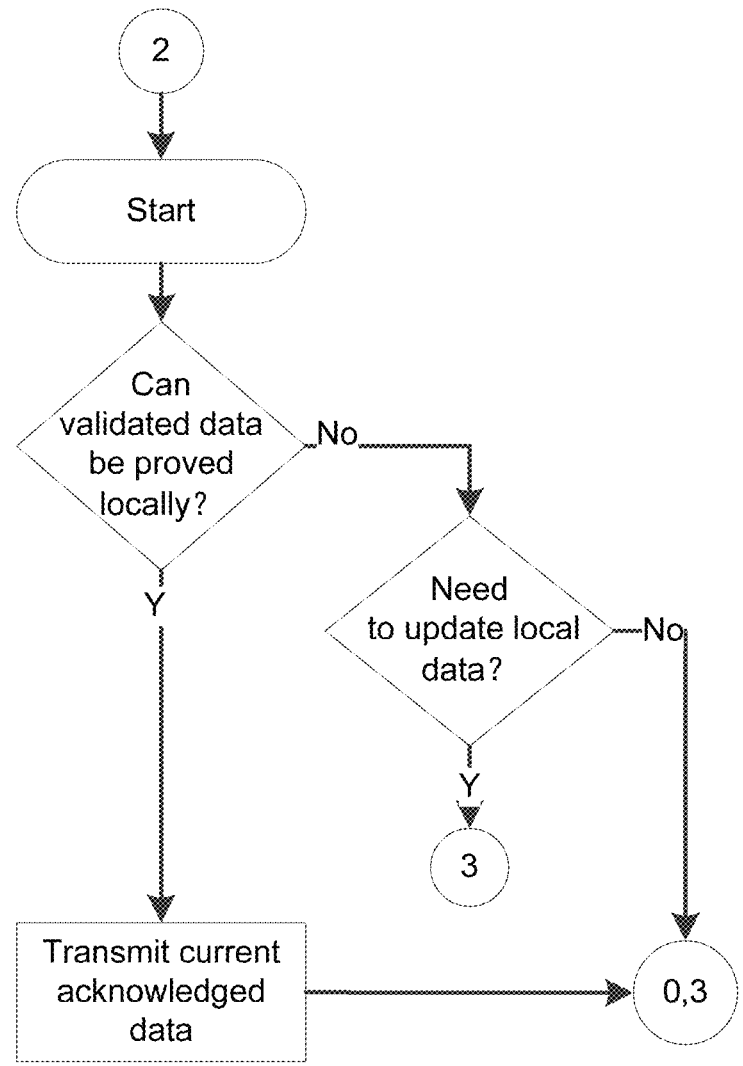
FIG. 6 illustrates an execution flow for any node to transmit data externally in response to a request to load acknowledged data in the present invention.

1) As shown in FIG. 5, the data block $[A]_0$ is initialized in the origination node of the peer-to-peer network without a master node. The data block is used as an acknowledged data to initialize the data block. The data block includes basic description information, shared computation rules, and legality identification rules C, and verification rules, which are broadcasted to the entire network to be acknowledged by other nodes. The acknowledgement can be represented by several responsive methods: 1. $[A]_T$ generated by other nodes based on the initial data block is received from other nodes requesting authentication; 2. Clear responses are received the other nodes; and 3. The original data block is directly used as an acknowledged data block of [A] is requested for validation by other nodes the, wherein cases 1 and 2 are the most common in applications.

2) Repeat step 1, and wait until there are other nodes accepting $[A]_0$ as the initial acknowledged data block.

Figure 8:
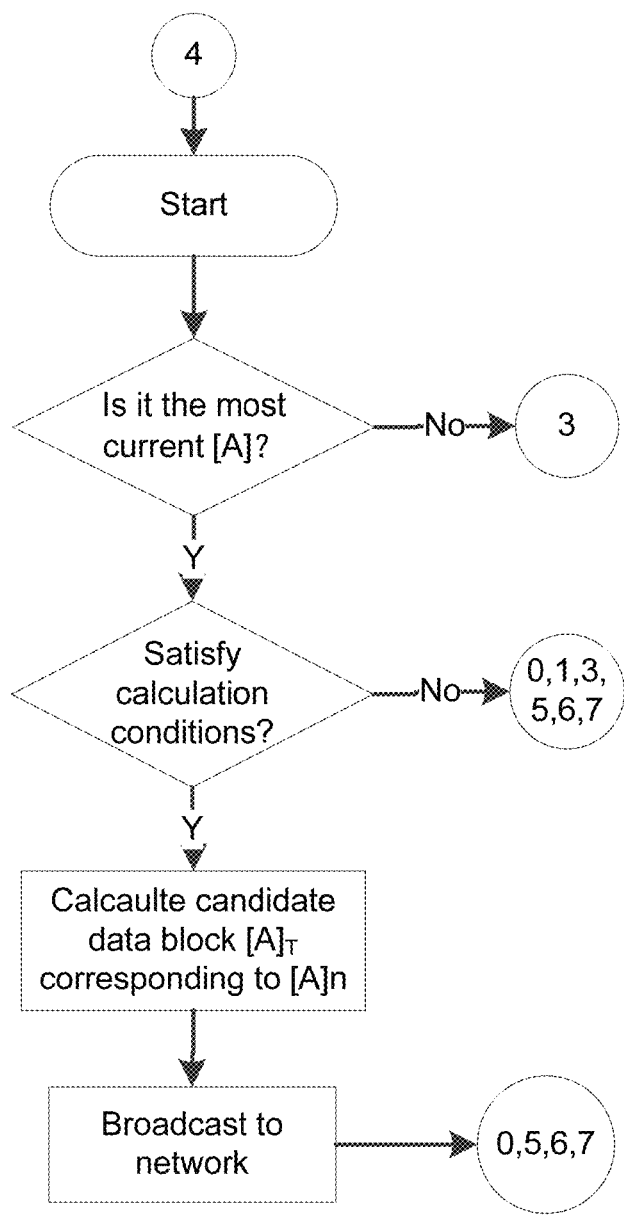
FIG. 8 illustrates an execution flow for a participating node to calculate candidate data block in the present invention.

3) The acknowledged data block $[A]_0$ is voluntarily held by other nodes in the peer-to-peer network. The nodes holding $[A]_0$ is the participating nodes of the acknowledged data. A digital digest of $[A]_0$ is used as the computation basis for subsequent new data. If there are several participating nodes desiring to add new data A to the acknowledged data block, these participating nodes need to respectively calculate and generate an acknowledged candidate data block $[A]_T$ subsequent to data $[A]_1$ according to the shared computation rules (shown in FIG. 8), and the digital digest of $[A]_0$ is included in $[A]_T$.

4) All the participating nodes in the peer-to-peer network that participate in the computations of $[A]_T$ add their verification results (or digital summaries) with the verification data F, and broadcast requests legitimacy verification from the participating nodes of the entire network.

5) The participating nodes in the peer-to-peer network monitor the legitimacy verification requests to other computing nodes, count the broadcast packets that have the same computation result as the current node, and ignore the broadcast packets that are inconsistent with the computation results of the current node or whose authentication data F is incorrect.

Figure 9:
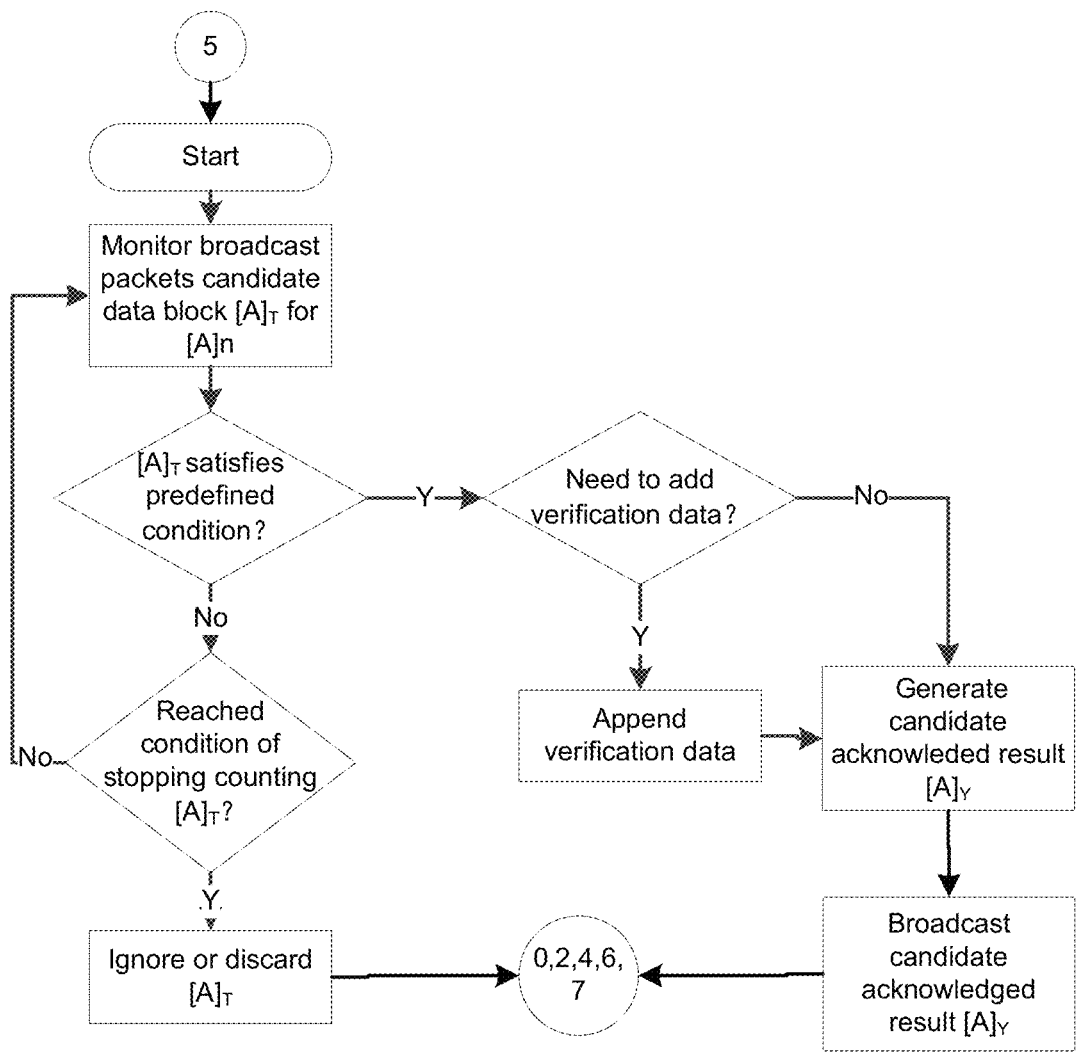
FIG. 9 illustrates an execution flow for a node to calculate a candidate acknowledged result in the present invention.

6) As shown in FIG. 9, when the count value of the node reaches the value specified by the legality determination rules C, the node determines its own computation result $[A]_T$ as a candidate acknowledged result. The verification data F is attached to the candidate data block $[A]_T$ to produce candidate acknowledged result $[A]_Y$, which is broadcasted.

Figure 10:
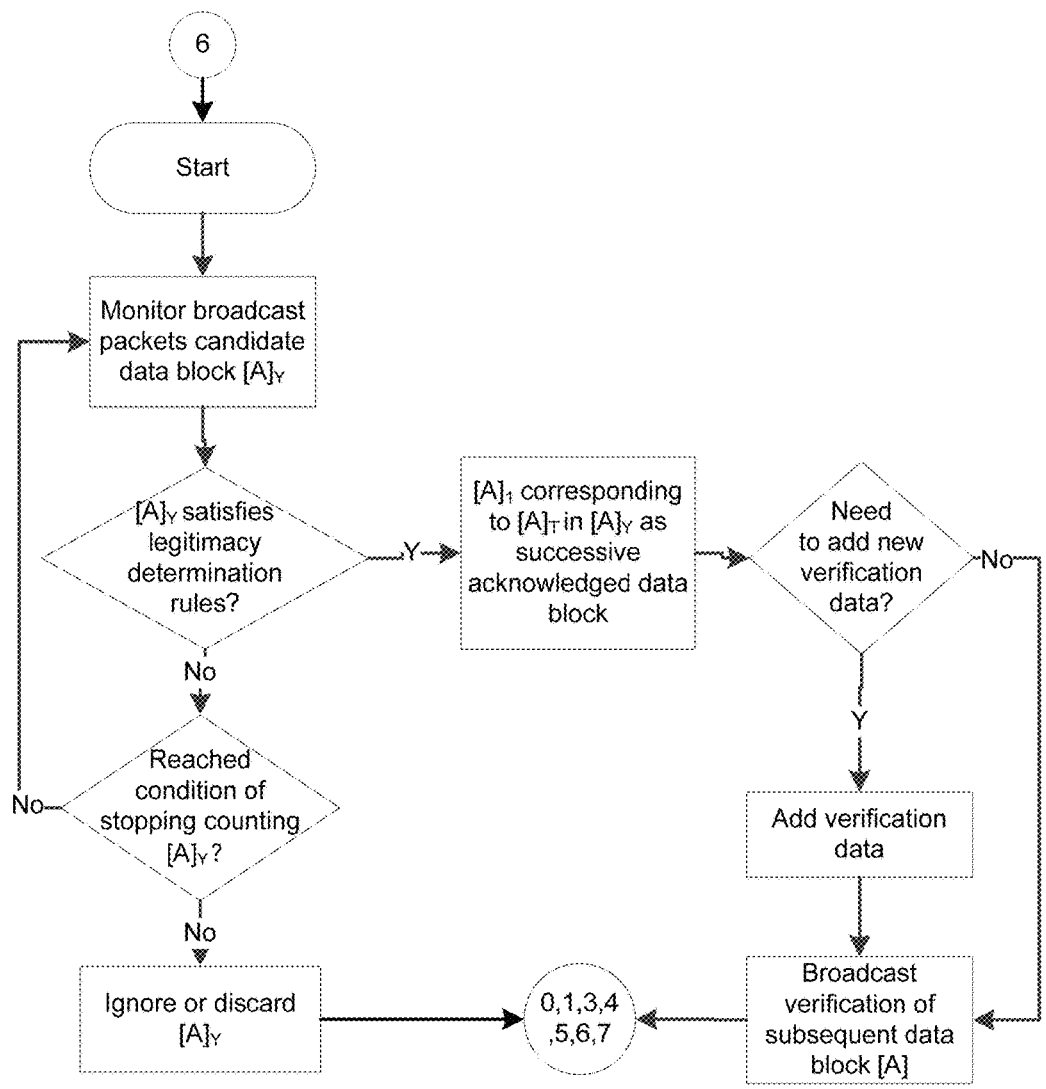
FIG. 10 illustrates an execution flow for a node to calculate acknowledged result in the present invention.
Figure 11:
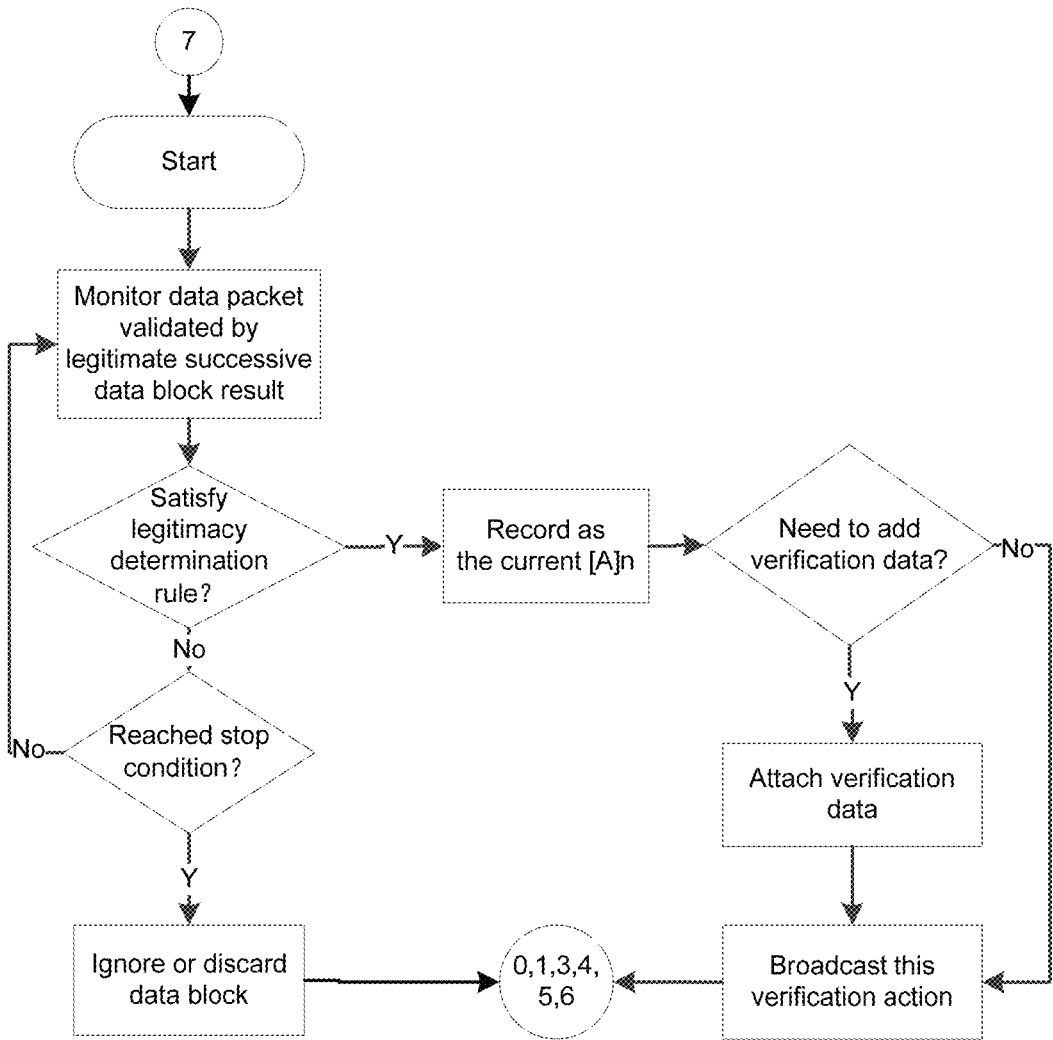
FIG. 11 illustrates an execution flow for a node to verify acknowledged result in the present invention.

7) All participating nodes in the peer-to-peer network monitor and verify $[A]_Y$ using the validation rules, and send verification results to any monitoring node. The monitoring nodes discard packets having authentication error and count the correct $[A]_Y$. As shown in FIG. 10, when the count value reaches the condition specified by the legitimacy determination rules C, $[A]_1$ corresponding to $[A]_T$ in $[A]_Y$ is adopted by the node as a legally acknowledged data block [A] and the result is broadcasted to the entire network.

Figure 1:
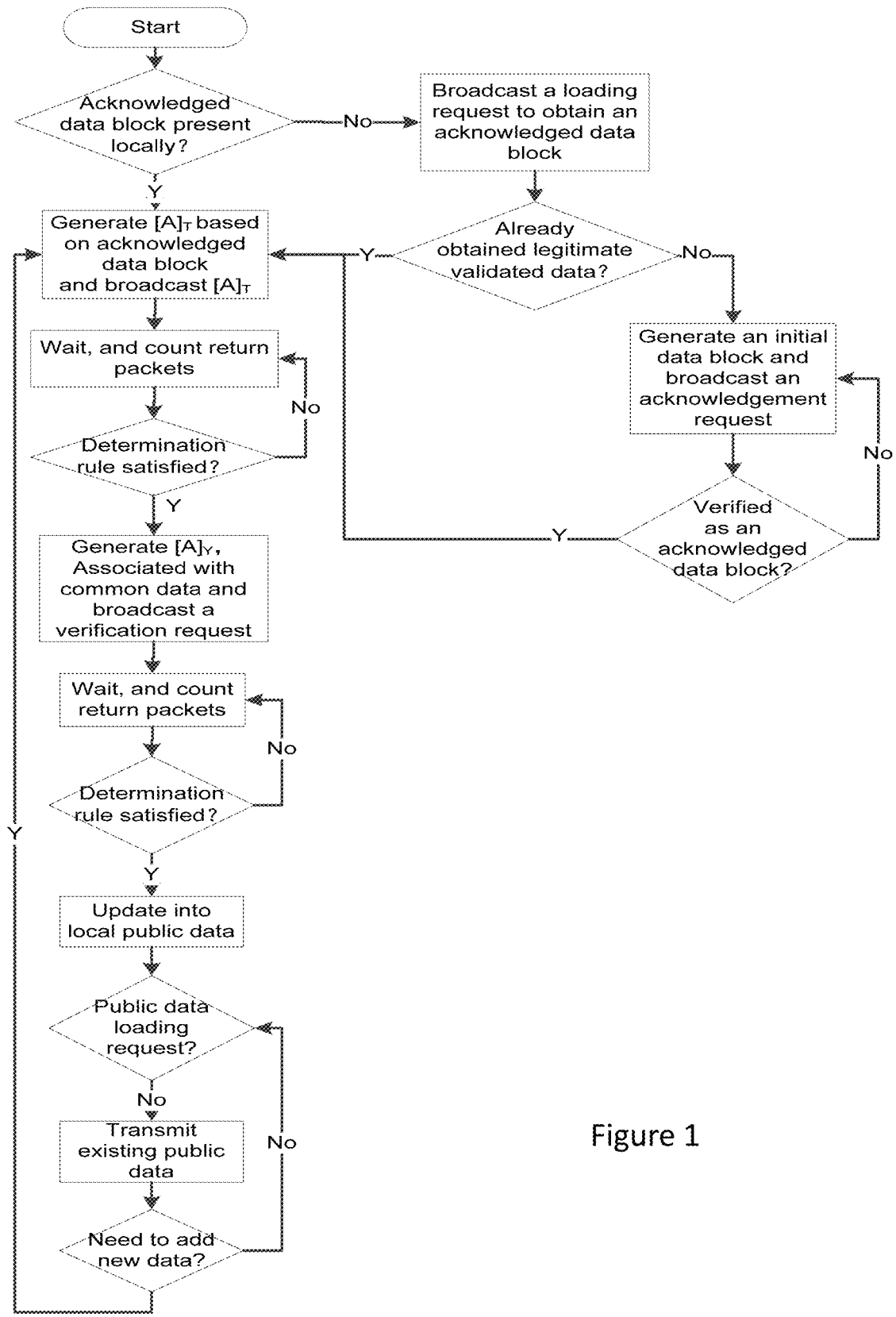
FIG. 1 illustrates the operation flow of nodes on data in accordance with the present invention.
Figure 2:
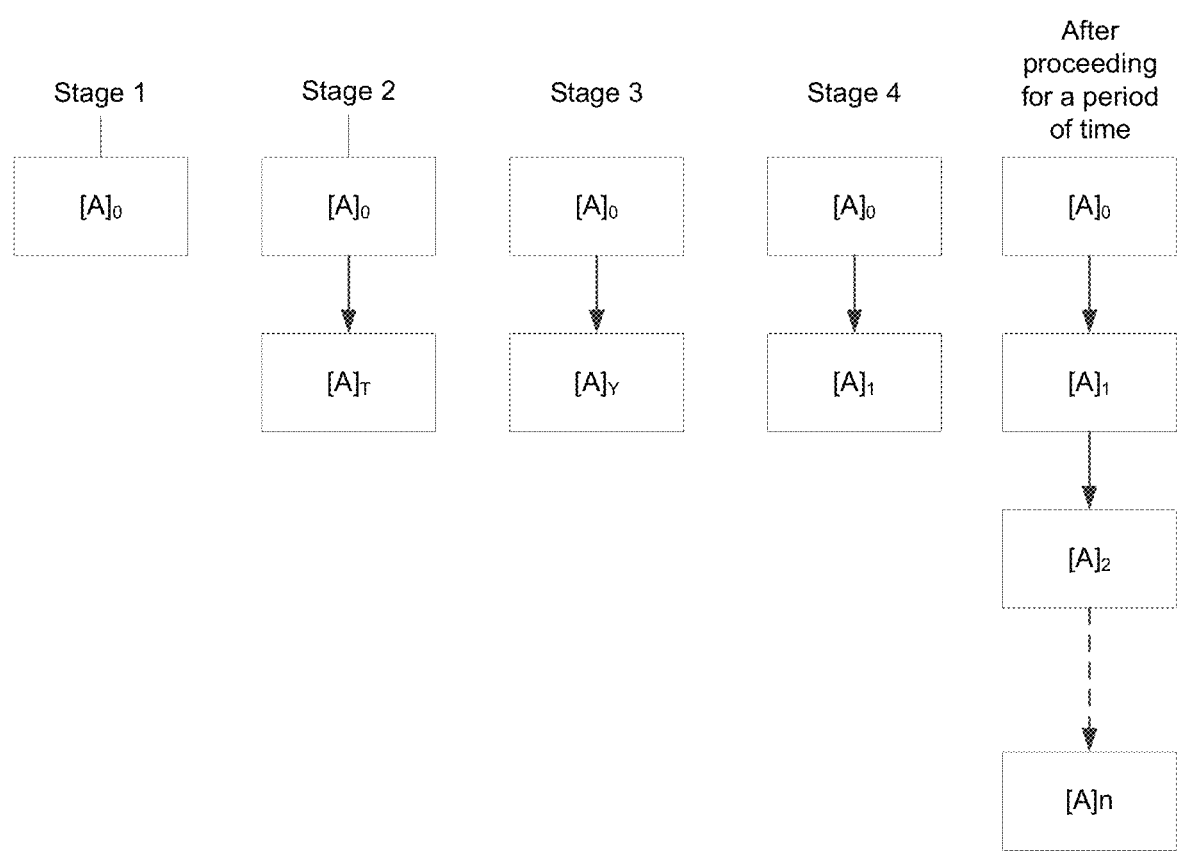
FIG. 2 illustrates the manner in which acknowledged data is generated and maintained in the present invention.
Figure 3:
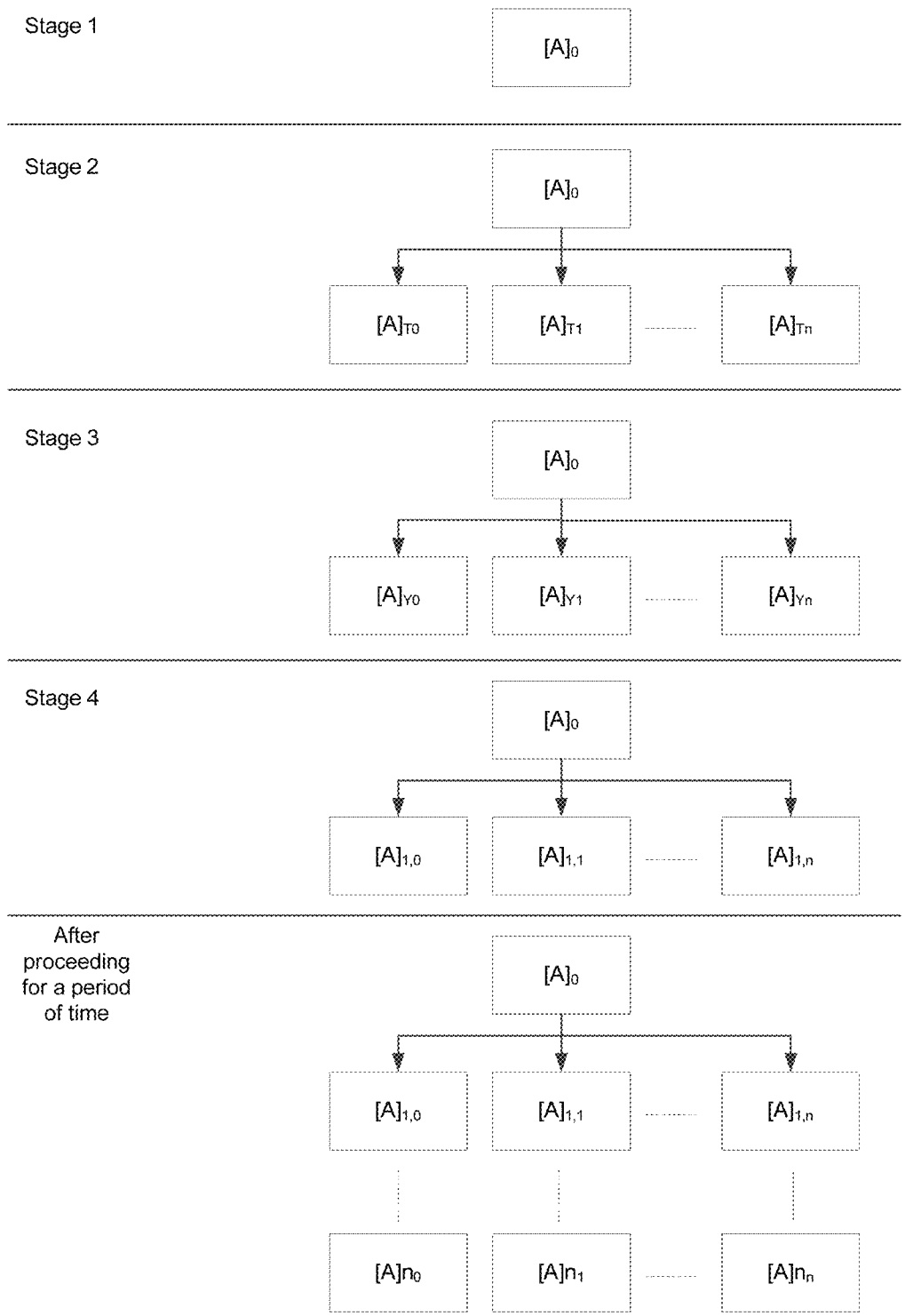
FIG. 3 illustrates the manner in which multiple nodes simultaneously generate and maintain acknowledged data in the present invention.
Figure 4:
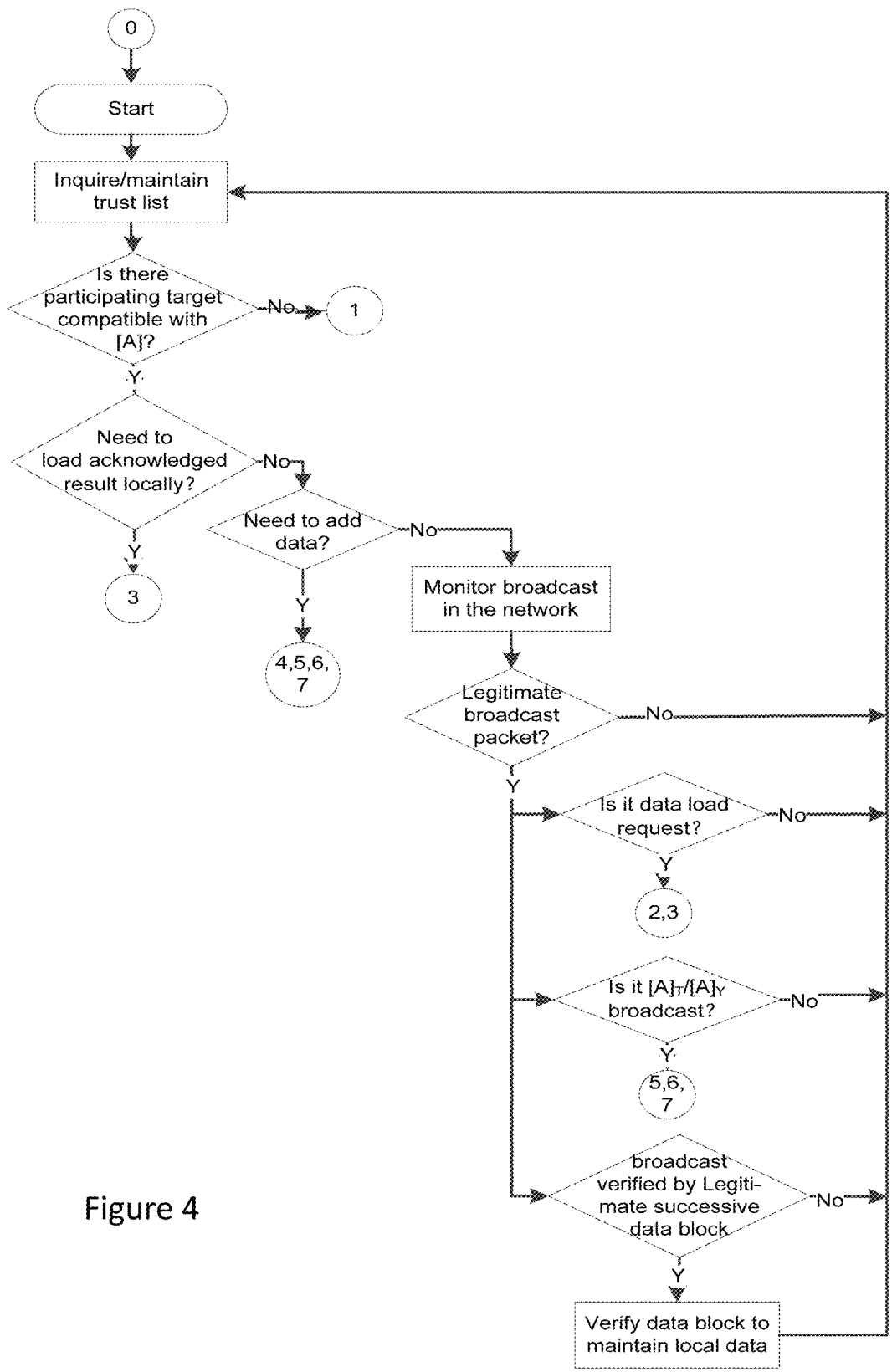
FIG. 4 illustrates an exemplified execution flow for any node to participate in generating and maintaining trusted data in the present invention.

8) The digital digest of $[A]_1$ is used as the computation basis for subsequent new data. Repeat step 3 (as shown in FIG. 4) to add the new data $[A]_n$ to the acknowledged data block [A], where [A] represents all data blocks $[A]_0$~$[A]_n$. $[A]_0$ contains rules description data.

Figure 7:
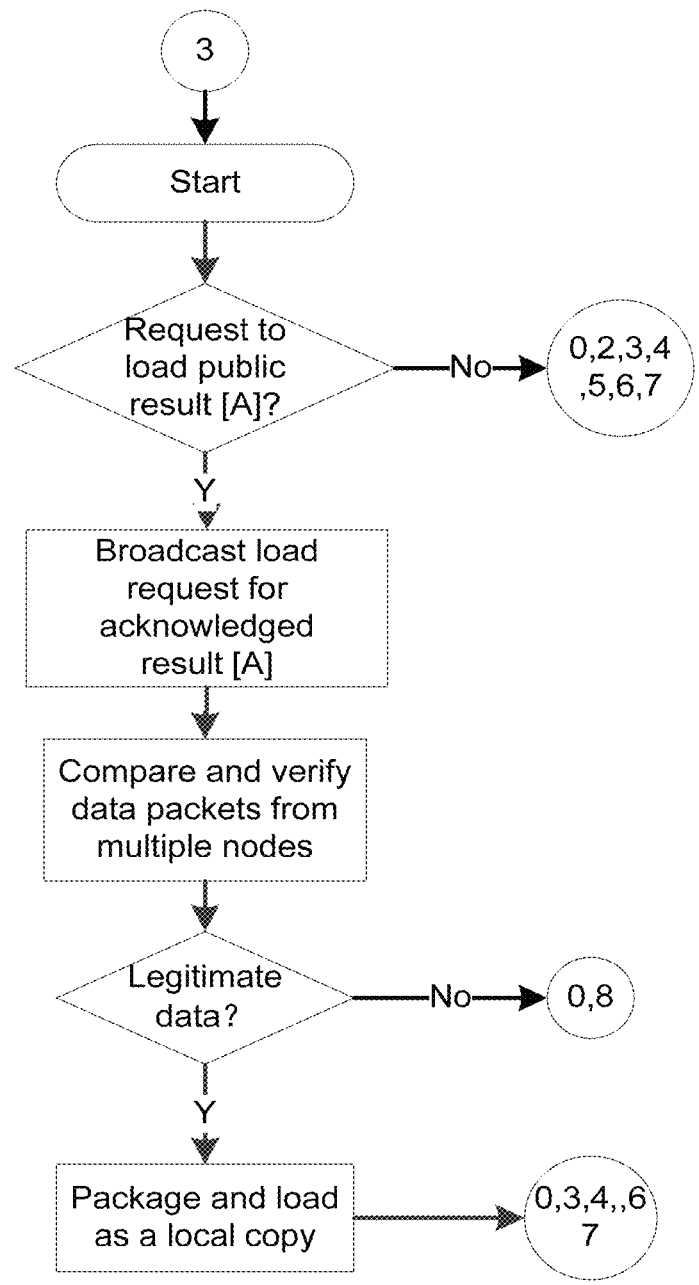
FIG. 7 illustrates an execution flow for any node to load an acknowledged result in the present invention.

9) When a new node joins the peer-to-peer distributed network, it can randomly request existing nodes to obtain all or part of a copy of the acknowledged data block [A] containing $[A]_0$ (as shown in FIG. 7), and can randomly request other multiple nodes for a copy of the corresponding data to verify the validity and correctness of [A] (by randomly requesting all or part of the data [A] from other nodes, comparing the consistency of the obtained data, eliminating the false information of the malicious node, using the "validation rules" defined in the "base description information" to verify the correctness of the data, being able to verify the legitimacy of [A]). After all or part of the necessary [A] for subsequent computations or query computation is obtained, repeating Step 3 to participate in the $[A]_n$ computation process.

Figure 12:
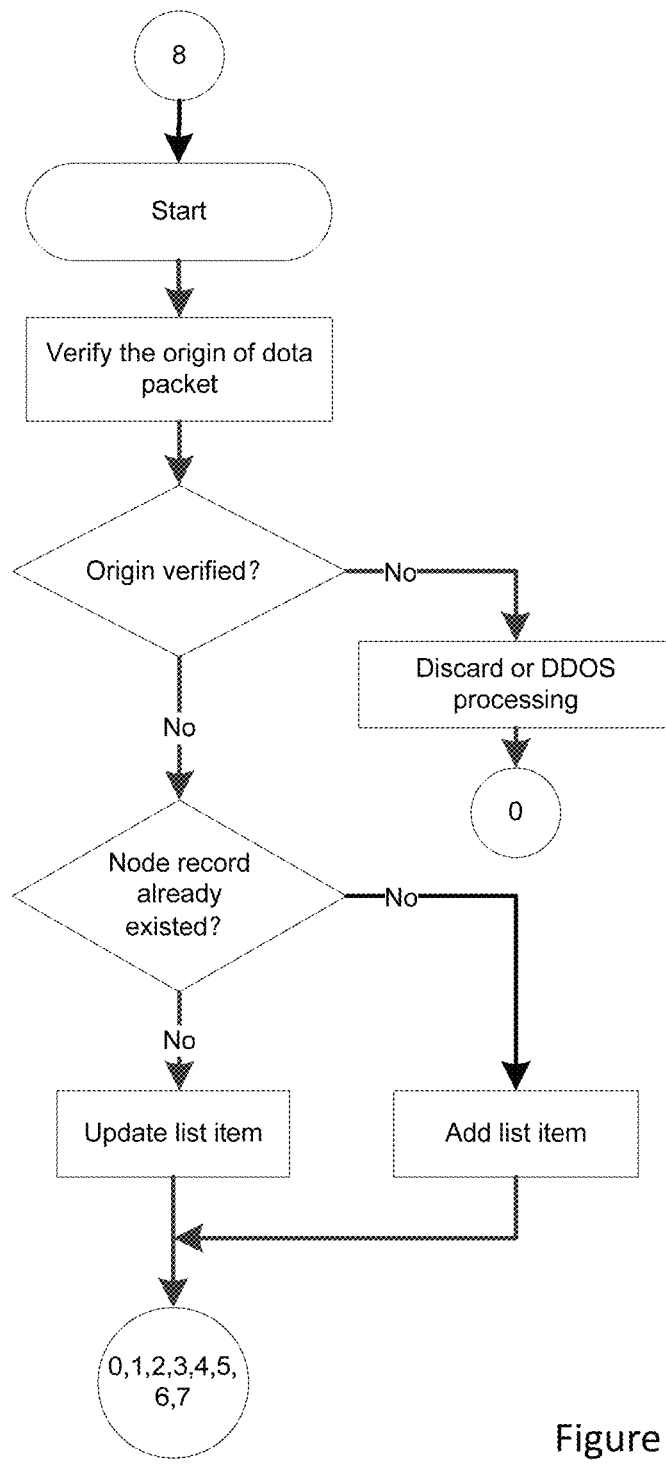
FIG. 12 illustrates an execution flow of maintaining a trust list at a node in the present invention.

As shown in FIG. 4 and FIG. 12, the node locally maintains a trust list for other nodes to optimize the computation process. The node counts the number of legitimate data blocks and illegal data blocks transmitted from other nodes and records them into the trust list. The ratio of the count of legitimate data blocks to illegal data blocks by a certain node is used as a measure for the credibility of that node. Priority is given to requests/broadcasts from nodes with high credibility.

Implementation Method 2

Implementation environment and conditions: public networks, private networks, or public-private mixed networks comprising some master nodes, and the network nodes running the software of the present invention.

1) As shown in FIG. 5, each initial node in the network has its own initialization data block $[A]_{0i}$ ($1<=i<=n$, $n>0$). The data block collection serves as a basis for initial computation of the acknowledged data, and initializes the acknowledged data block collection. Each data block in the collection includes public or unique basic description information, shared computation rules, legitimacy determination rules C, and verification rules, or references including the above information, or access sources, links or addresses of the above information, which is broadcast to the whole network to seek other nodes' acknowledgement. The acknowledgement can be represented by several responsive methods: 1. $[A]_T$ generated by other nodes based on the initial data block is received from other nodes requesting authentication; 2. Clear responses are received the other nodes; and 3. The original data block is directly used as an acknowledged data block of [A] is requested for validation by other nodes the, wherein cases 1 and 2 are the most common in applications.

2) Repeat step 1, and wait until there are other nodes accepting $[A]_0$ as the initial acknowledged data block.

3) The set of known data blocks $\{[A]_{0i}\}$ is voluntarily held by other nodes on the network. The nodes holding all or part of the data block in $\{[A]_{0i}\}$ are the participating nodes of the acknowledged data. The digital digest of $[A]_0$ is used as the computation basis for subsequent new data. If there are several participating nodes desiring to add new data A to the acknowledged data block, these participating nodes need to respectively calculate and generate a acknowledged candidate data block $[A]_T$ subsequent to data $[A]_{1j}$ ($1<=j<=m$, $m>0$) according to the shared computation rules, and the digital digest of $[A]_0$ is included in $[A]_T$;

4) All the participating nodes in the peer-to-peer network that participate in the computations of $[A]_T$ add their verification results (or digital summaries) with the verification data F, and broadcast requests legitimacy verification from the participating nodes of the entire network.

5) The participating nodes in the peer-to-peer network monitor the legitimacy verification requests to other computing nodes, count the broadcast packets that have the same computation result as the current node, and ignore the broadcast packets that are inconsistent with the computation results of the current node or whose authentication data F is incorrect. The computation results are broadcasted back to the request sending nodes.

6) When the count value of the node reaches the value specified by the legality determination rules C, the node determines its own computation result $[A]_T$ as a candidate acknowledged result. The verification data F is attached to the candidate data block $[A]_T$ to produce candidate acknowledged result $[A]_Y$, which is broadcasted.

7) All participating nodes in the peer-to-peer network monitor and verify $[A]_Y$ using the validation rules, and send verification results to any monitoring node. The monitoring nodes discard packets having authentication error, forward the verification result at the same time, and count the correct $[A]_Y$. As shown in FIG. 10, when the count value reaches the condition specified by the legitimacy determination rules C, $[A]_1$ corresponding to $[A]_T$ in $[A]_Y$ is adopted by the node as a legally acknowledged data block [A] and the result is broadcasted to the entire network.

8) The digital digest of $[A]_1$ is used as the computation basis for subsequent new data. Repeat step 2 (as shown in FIG. 4) to add the new data $[A]_n$ to the acknowledged data block [A], where [A] represents all data blocks $[A]_0 \sim [A]_n$. $[A]_0$ contains rules description data.

Implementation Method 3

Implementation environment and conditions: public networks, private networks, or public-private mixed networks comprising some master nodes, and the network nodes running the software of the present invention.

1) As shown in FIG. 5, each initial node in the network has its own initialization data block $[A]_{0i}$ ($1<=i<=n$, $n>0$). The data block collection serves as a basis for initial computation of the acknowledged data, and initializes the acknowledged data block collection. The data block collection is broadcasted to the entire network for acknowledgement by other nodes. The broadcast information also includes public or unique basic description information, shared computation rules, legitimacy determination rules C, and verification rules, or the above information acquisition links or address.

2) Repeat step 1, and wait until there are other nodes accepting $[A]_0$ as the initial acknowledged data block, and select or generate an acknowledged data block $[A]_0$ according to the shared computation rules.

3) The acknowledged data block $[A]_0$ is voluntarily held by other nodes on the network, and the node holding the $[A]_0$ data block is the participating node of the acknowledged data. The digital digest of $[A]_0$ is used as the computation basis for subsequent new data. If there are several participating nodes wishing to add new data A to the accepted data block, these participating nodes need to separately calculate and generate subsequent data according to the computation rules of the public or proprietary protocols. $[A]_1$ candidate data block $[A]_T$, and the digital digest of $[A]_0$ is included in $[A]_T$.

4) All the participating nodes in the peer-to-peer network that participate in the computations of $[A]_T$ add their verification results (or digital summaries) with the verification data F, and broadcast requests legitimacy verification from the participating nodes of the entire network.

5) The participating nodes in the peer-to-peer network monitor the legitimacy verification requests to other computing nodes, count the broadcast packets that have the same computation result as the current node, and ignore the broadcast packets that are inconsistent with the computation results of the current node or whose authentication data F is incorrect. The computation results are broadcasted back to the request sending nodes.

6) When the count value of the node reaches the value specified by the legality determination rules C, the node determines its own computation result $[A]_T$ as a candidate acknowledged result. The verification data F is attached to the candidate data block $[A]_T$ to produce candidate acknowledged result $[A]_Y$, which is broadcasted.

7) The master node or all participating nodes in the network monitor and verify $[A]_Y$ using the validation rules, and send verification results to any monitoring node. The monitoring nodes discard packets having authentication error, forward the verification result at the same time, and count the correct $[A]_Y$. When the count value reaches the condition specified by the legitimacy determination rules C, $[A]_1$ corresponding to $[A]_T$ in $[A]_Y$ is adopted by the node as a legally acknowledged data block [A] and the result is broadcasted to the entire network.

8) The digital digest of $[A]_1$ is used as the computation basis for subsequent new data. Repeat step 2 (as shown in FIG. 4) to add the new data $[A]_n$ to the acknowledged data block [A], where [A] represents all data blocks $[A]_0$~$[A]_n$. $[A]_0$ contains rules description data.

Implementation Method 4

Implementation environment and conditions: public networks without master nodes, or public networks, private networks, or public-private mixed networks comprising some master nodes; the network nodes running the software of the present invention.

1) Before participating in a specific computation, the node monitors and counts broadcast packets broadcasted in the network (as shown in FIG. 4 and FIG. 12), and initializes and maintains locally a classification trust list for other nodes. The ratio of the count of legitimate data blocks to the count illegal data blocks received from a certain node is used as a measured for the credibility of that node. According to the trusted list, the node decides which other nodes are to be involved in subsequent computations.

2) The node initializes the data block $[A]_0$ at the initiation node in the network. This data block is used as a indicator initiation data block for this node or for certain classification data. The data block includes basic description information, shared computation rules, legitimacy determination rules C and verification Rules. The request is broadcasted to the nodes selected in the previous step.

3) Repeat step 1, and wait until there are other nodes accepting $[A]_0$ as the initial acknowledged data block.

4) The acknowledged data block $[A]_0$ is voluntarily held by other nodes on the network, and the node holding the $[A]_0$ data block is the participating node of the acknowledged data. The digital digest of $[A]_0$ is used as the computation basis for subsequent new data. If there are several participating nodes wishing to add new data A to the accepted data block, these participating nodes need to separately calculate and generate subsequent data according to the computation rules of the shared or proprietary protocols. $[A]_1$ candidate data block $[A]_T$, and digital digest of $[A]_0$ is included in $[A]_T$.

5) All the participating nodes in the network that participate in the computations of $[A]_T$ add their verification results (or digital summaries) with the verification data F, and broadcast requests legitimacy verification from the participating nodes of the entire network;

6) The participating nodes in the network monitor the legitimacy verification requests to other computing nodes, count the broadcast packets that have the same computation result as the current node, and ignore the broadcast packets that are inconsistent with the computation results of the current node or whose authentication data F is incorrect.

7) When the count value of the node reaches the value specified by the legality determination rules C, the node determines its own computation result $[A]_T$ as a candidate acknowledged result. The verification data F is attached to the candidate data block $[A]_T$ to produce candidate acknowledged result $[A]_Y$, which is broadcasted.

8) The master node or all participating nodes in the network monitor and verify $[A]_Y$ using the validation rules, and send verification results to any monitoring node. The monitoring nodes discard packets having authentication error, forward the verification result at the same time, and count the correct $[A]_Y$. When the count value reaches the condition specified by the legitimacy determination rules C, $[A]_1$ corresponding to $[A]_T$ in $[A]_Y$ is adopted by the node as a legally acknowledged data block [A] and the result is broadcasted to the entire network.

9) The digital digest of $[A]_1$ is used as the computation basis for subsequent new data. Repeat step 2 (as shown in FIG. 4) to add the new data $[A]_n$ to the acknowledged data block [A], where [A] represents all data blocks $[A]_0$~$[A]_n$. $[A]_0$ contains rules description data.

What is claimed is:

1. A method for generating trusted data in a computer network, comprising:
   1) in a computer network comprising a plurality of nodes, initiating multiple data blocks and defining associated shared computation rules respectively by multiple nodes among the plurality of nodes, comprising:
      initializing a data block $[A]_0$ and defining associated shared computation rules by one of the plurality of nodes in the computer network which serves as an initial node for the data block $[A]_0$ and the associated shared computation rules, and broadcasting the data block $[A]_0$ and the shared computation rules to the computer network;
   2) recognizing a node that has acknowledged the data block $[A]_0$ as a participating node;
   3) when n participating nodes need to add new data A, independently computing a candidate data block $[A]_T$ of $[A]_1$ by the n participating nodes according to the shared computation rules, wherein the data block $[A]_1$ includes the new data A, which is a successor data block to $[A]_0$;
   4) respectively broadcasting respective computation results $[A]_T$ by the n participating nodes to other participating nodes; and
   5) monitoring broadcast packets and performing computations on the computation result $[A]_T$ by the one of the other participating nodes; when a computation result satisfies a predetermined condition, determining the computation result $[A]_T$ as an acknowledged candidate result by the one of the other participating nodes, and broadcasting the computation result $[A]_T$.

2. A method of claim 1, comprising:
   1) when n participating nodes associated with n acknowledged data blocks $[A]_n$ need to add new data A, computing a candidate data block $[A]_T$ for data block $[A]_{n+1}$ by the n participating nodes in accordance with the shared computation rules corresponding to the data blocks $[A]_n$, wherein the data block $[A]_{n+1}$ contains new data A, wherein a node that has acknowledged the data blocks $[A]_n$, is recognized as a participating node by the computer network;
   2) respectively broadcasting respective computation results $[A]_T$ by the n participating nodes to other participating nodes; and
   3) monitoring broadcast packets and performing computations on the computation result $[A]_T$ by the one of the other participating nodes; when a computation result satisfies a predetermined condition, determining the computation result $[A]_T$ as an acknowledged candidate result by the one of the other participating nodes, and broadcasting the computation result $[A]_T$.

3. The method of claim 2, wherein the step of respectively broadcasting respective computation results $[A]_T$ by the n participating nodes to other participating nodes comprises:

respectively appending verification data to the respective computation results $[A]_T$ by the n participating nodes and broadcasting computation results $[A]_T$ appended with the verification data to other participating nodes,
wherein the step of determining the computation result $[A]_T$ as an acknowledged candidate result by the one of the other participating nodes comprises:
appending verification data to a correspond computation result $[A]_T$ to denote as $[A]_y$ by the one of the other participating nodes; and broadcasting $[A]_y$ as an acknowledged candidate.

4. The method of claim 3, wherein the acknowledged candidate $[A]_y$ are monitored and verified by the other participating nodes, and a verification result is broadcasted to a monitoring node, wherein broadcast packets are monitored and computations are performed on the computation result $[A]_T$ by the participating node, wherein when a computation result satisfies a predetermined condition, the computation result $[A]_T$ is determined as an acknowledged candidate result and is broadcasted by the other participating node.

5. The method of claim 2, wherein broadcast packets are monitored and the acknowledged candidate result $[A]_T$ is verified by a participating node, wherein a verification result is broadcasted to a monitoring node, wherein the monitoring node collects the verification result and performs computation on broadcast packets, wherein when the computation result satisfies a predetermined condition, the monitoring node determines $[A]_{n+1}$ corresponding to the computation result $[A]_T$ as an acknowledged candidate result by the one of the other participating nodes, and broadcasts $[A]_{n+1}$ to the computer network.

6. The method of claim 2, wherein when a new node joins a peer-to-peer distributed network formed by the n participating nodes, the new node requests any of the n participating nodes to provide all or a portion of currently acknowledged result [A], wherein the validity and correctness of the currently acknowledged result [A] are verified based on data packets returned from any of the n participating nodes, wherein after the verification passes, the new node becomes a participating node.

7. The method of claim 2, wherein when the new data is added, each of the n participating nodes makes a digital digest of the data block $[A]_{n-1}$ or any data block in the data block group [A], wherein the digital digest is used as the computation basis for a subsequent new data block $[A]_n$ and included in a newly generated $[A]_T$, wherein steps 2) through 3) are repeated to update the acknowledged data block [A].

8. The method of claim 1, wherein the data block $[A]_0$ further includes legitimacy determination rules and verification rules, wherein in step 5), the broadcast packets are verified by the one of the other participating nodes using the verification rules, wherein after the verification is passed, the computation result $[A]_T$ in the broadcast packet is calculated,
wherein when a computation result satisfies a predetermined condition associated with legitimacy determination rules, the computation result $[A]_T$ is determined as an acknowledged candidate result by the one of the other participating nodes, and the computation result $[A]_T$ is broadcasted.

9. The method of claim 8, wherein the data block $[A]_0$ is initialized and broadcasted to the computer network via an origination node.

10. The method of claim 9, wherein basic description information, the shared computation rules, the legitimacy determination rules, and the verification rules are defined by the origination node.

11. The method of claim 1, wherein each of the n participating nodes independently maintains a trust list for other participating nodes.

12. The method of claim 1, wherein when the new data is added, each of the n participating nodes makes a digital digest of the data block $[A]_{n-}$, or any data block in the data block group [A], wherein the digital digest is used as the computation basis for a subsequent new data block $[A]_n$ and included in a newly generated $[A]_T$, wherein steps 4) through 5) are repeated to update the acknowledged data block [A].

* * * * *